United States Patent
Shiozaki

(10) Patent No.: US 10,085,010 B2
(45) Date of Patent: Sep. 25, 2018

(54) IMAGING SYSTEM FOR CAPTURING AN IMAGE OF THE SAME OBJECT USING A PLURALITY OF IMAGE CAPTURING APPARATUSES THAT CAN COMMUNICATE WITH EACH OTHER

(71) Applicant: CANON KABUSHIKI KAISHA, Tokyo (JP)

(72) Inventor: Tomoyuki Shiozaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/197,454

(22) Filed: Jun. 29, 2016

(65) Prior Publication Data
US 2016/0309139 A1 Oct. 20, 2016

Related U.S. Application Data

(63) Continuation of application No. 13/206,962, filed on Aug. 10, 2011.

(30) Foreign Application Priority Data

Aug. 20, 2010 (JP) .................................. 2010-185275

(51) Int. Cl.
*H04N 5/225* (2006.01)
*H04N 13/243* (2018.01)
*G03B 35/08* (2006.01)
*H04N 5/232* (2006.01)
*H04N 5/247* (2006.01)

(52) U.S. Cl.
CPC ........... *H04N 13/243* (2018.05); *G03B 35/08* (2013.01); *H04N 5/23203* (2013.01); *H04N 5/23212* (2013.01); *H04N 5/247* (2013.01)

(58) Field of Classification Search
CPC .... H04N 13/04; H04N 13/0242; H04N 5/247; G03B 35/08
USPC ............................................... 348/218.1, 247
See application file for complete search history.

(56) References Cited

U.S. PATENT DOCUMENTS

2002/0145660 A1* 10/2002 Kanade .................. G03B 41/00
348/36

\* cited by examiner

*Primary Examiner* — Usman Khan
(74) *Attorney, Agent, or Firm* — Canon USA, Inc. I.P. Division

(57) ABSTRACT

An imaging system for capturing images of the same object using a plurality of image capturing apparatuses that can communicate with each other is provided. At least one image capturing apparatus of the image capturing apparatuses transmits information of a distance to an in-focus position, or a captured image including the in-focus position, to another image capturing apparatus among the image capturing apparatuses, and each of the image capturing apparatuses determines each depth of field using the information of the distance to the in-focus position, or the captured image including the in-focus position.

8 Claims, 7 Drawing Sheets

IMAGING SYSTEM FOR CAPTURING AN IMAGE OF THE SAME OBJECT USING A PLURALITY OF IMAGE CAPTURING APPARATUSES THAT CAN COMMUNICATE WITH EACH OTHER

CROSS-REFERENCE TO RELATED APPLICATIONS

This application is a continuation, and claims the benefit, of U.S. patent application Ser. No. 13/206,962, presently pending and filed on Aug. 10, 2011, which claims the benefit of priority from Japanese Patent Application No. 2010-185275 filed Aug. 20, 2010, each of which are hereby incorporated by reference herein in their entireties.

BACKGROUND OF THE INVENTION

Field of the Invention

The present invention relates to an imaging system for capturing an image of the same object using a plurality of image capturing apparatuses that can communicate with each other, and the image capturing apparatuses used in the system.

Description of the Related Art

In recent years, three-dimensional image shooting systems have been attracting attention in digital contents such as movie films. Regarding the conventional three-dimensional image shooting apparatuses, for example, Japanese Patent Application Laid-Open No. 62-21396 provides a technique for obtaining a three-dimensional image from images captured by a plurality of image capturing apparatuses such as three-dimensional television devices.

As in the technique discussed in Japanese Patent Application Laid-Open No. 62-21396, when the images of the same object are captured using the plurality of image capturing apparatuses and the three-dimensional image is obtained, if areas where individual shooting lenses come into focus differ from each other, it may leave an unnatural impression in generating the three-dimensional image. To solve the problem, conventionally, in order to focus the shooting lens of each image capturing apparatus on the object, the focal length and the diaphragm value of each shooting lens are to be adjusted before the shooting. However, the operation is troublesome.

SUMMARY OF THE INVENTION

The present invention is directed to simplify focusing operation of image capturing apparatuses in capturing images of the same object using the plurality of image capturing apparatuses.

According to an aspect of the present invention, an imaging system for capturing images of the same object using a plurality of image capturing apparatuses that can communicate with each other is provided. At least one image capturing apparatus of the image capturing apparatuses transmits information of a distance to an in-focus position, or a captured image including the in-focus position, to another image capturing apparatus among the image capturing apparatuses, and each of the image capturing apparatuses determines each depth of field using the information of the distance to the in-focus position, or the captured image including the in-focus position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
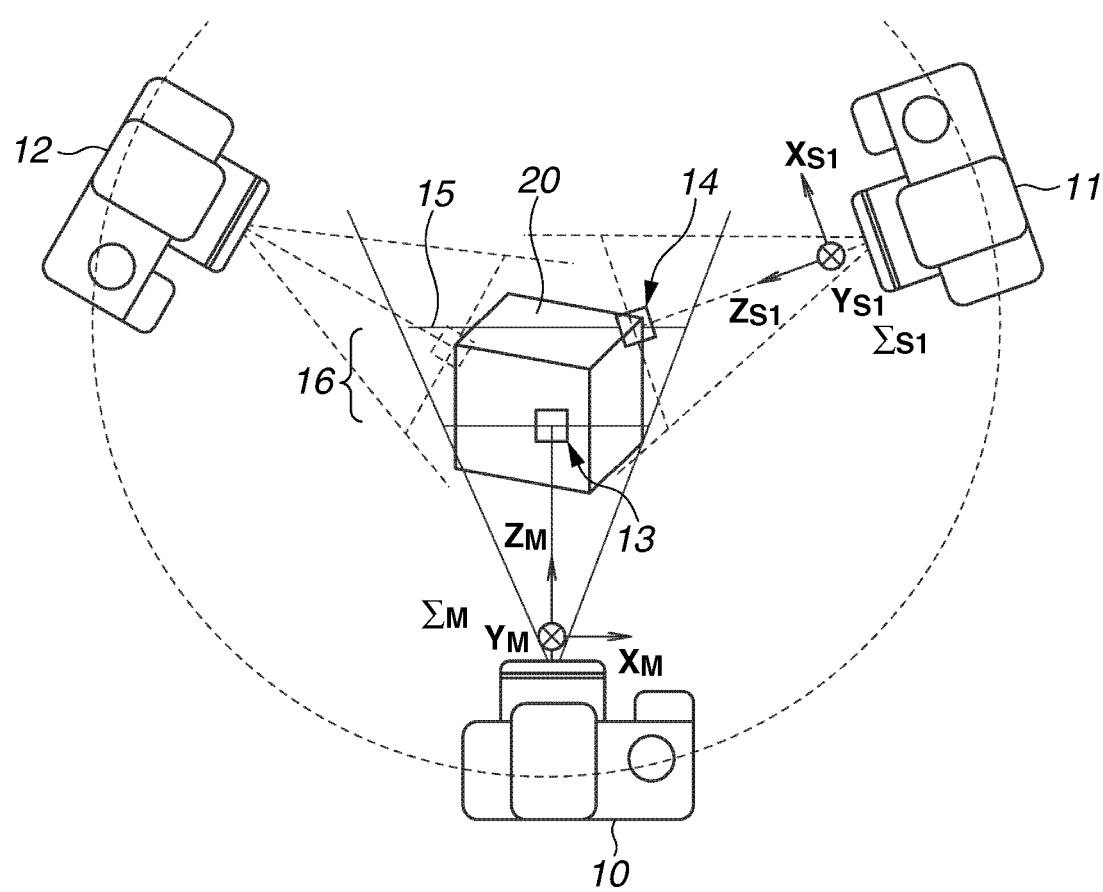
FIG. 1 illustrates a configuration of an imaging system.

FIG. 1 illustrates a configuration of an imaging system according to the first exemplary embodiment. Reference numeral 10 denotes a master camera, and reference numerals 11 and 12 denote slave cameras respectively. An object 20 is a target in the image capturing. FIG. 1 is only an example, and the number of cameras is not limited to the one in the example. As long as images of the same object are captured using a plurality of image capturing apparatuses that can communicate with each other, the number can be any number.

Figure 2:
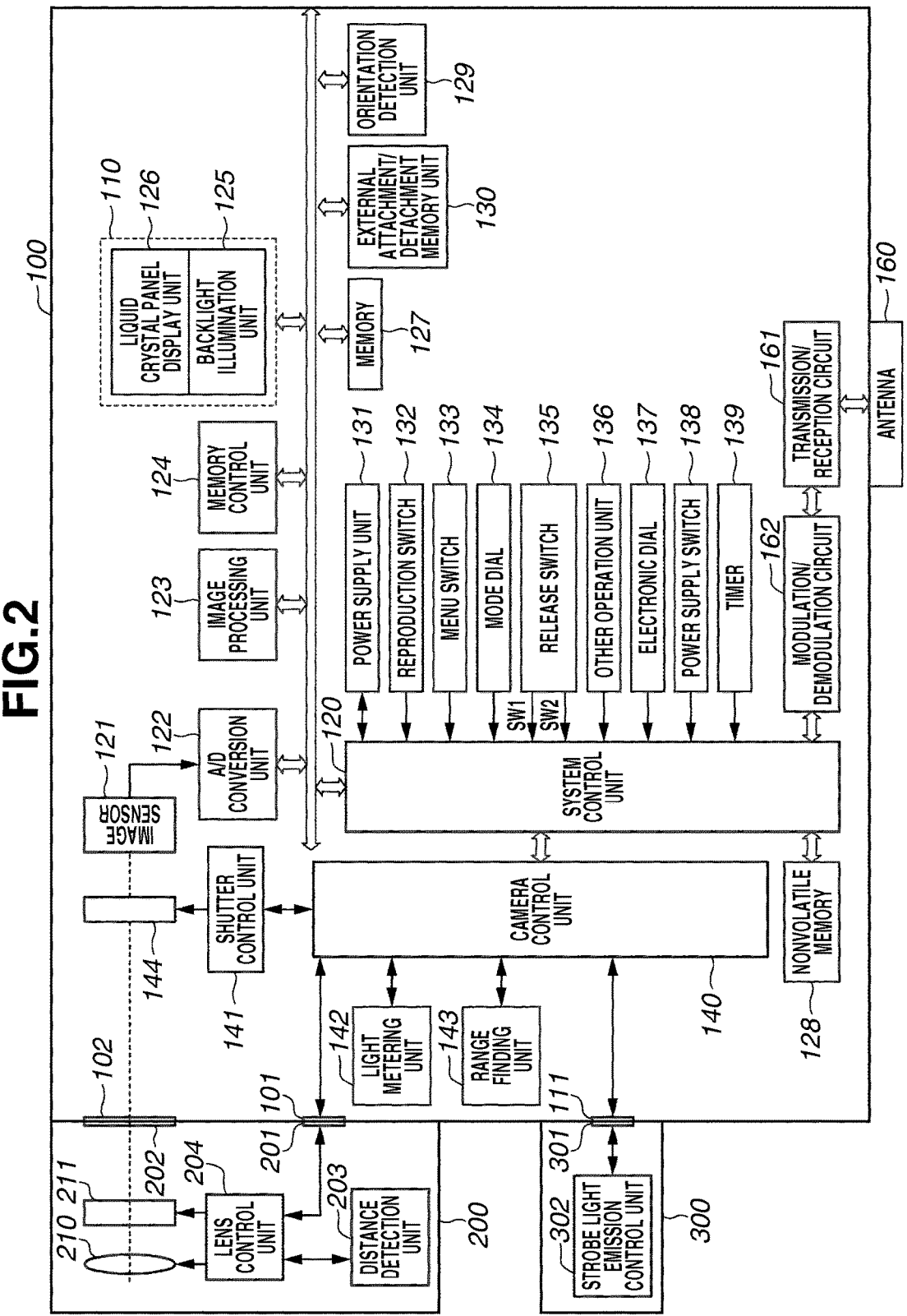
FIG. 2 illustrates an example of a configuration of an image capturing apparatus.

FIG. 2 illustrates an example of a configuration of a digital camera that is the image capturing apparatus that serves as the master camera 10 or the slave cameras 11 and 12. Reference numeral 100 denotes a camera body. An image sensor 121 captures an image of an object. An optical image (not shown) of the object from a shooting lens 210 is formed on the image sensor 121 via lens mounts 102 and 202, and a shutter 144. The shooting lens 210 constitutes an imaging optical system that can vary a focal length and the image sensor 121 converts the optical image into an electric signal.

An analog-digital (A/D) conversion unit 122 converts the analog signal output of the image sensor 121 into a digital signal. The A/D-converted digital signal is controlled by a memory control unit 124 and a system control unit 120, and stored in a memory 127. An image processing unit 123 performs predetermined pixel interpolation or color conversion processing on the data of the digital signal or data from the memory control unit 124. The image processing unit 123 includes a compression/decompression circuit for compressing or decompressing image data using an adaptive discrete cosine transform (ADCT), or the like. The image processing unit 123 can read an image stored in the memory 127, perform compression processing or decompression processing, and write the processed data on the memory 127. The image processing unit 123 also can perform detection of similar images existing in different image data by performing calculation such as correlation calculation of the different image data.

The memory control unit 124 controls transmission and reception of data between the A/D conversion unit 122, the image processing unit 123, a liquid crystal panel display unit 125, and an external attachment/detachment memory unit 130 and the memory 127. The data of the A/D conversion unit 122 is written in the memory 127 via the image processing unit 123 and the memory control unit 124, or the data of the A/D conversion unit 122 is written in the memory 127 directly via the memory control unit 124.

A liquid crystal display type display apparatus 110 includes the liquid crystal panel display unit 125 and a backlight illumination unit 126. According to an instruction from the system control unit 120, the liquid crystal panel display unit 125 can display a menu screen stored in a region for image display data in the memory 127 or an image file stored in the external attachment/detachment memory unit 130. The backlight illumination 126 performs backside illumination on the liquid crystal panel display unit 125. The light source elements of the backlight illumination include a light-emitting diode (LED), an organic electroluminescence (EL), a fluorescent tube, or the like.

The system control unit 120 performs overall control of the camera. The memory 127 stores captured still images and moving images, and images for reproduction display. The memory 127 has a storage capacity large enough to store the still images and the moving images of a predetermined number of sheets. A nonvolatile memory 128 is electrically erasable and recordable. As the nonvolatile memory 128, for example, a flash memory, an electrically erasable and programmable read only memory (EEPROM), or the like is used. The nonvolatile memory 128 stores programs for keeping the image shooting status, controlling the camera, and the like. An orientation detection unit 129 detects an orientation of the camera body 100.

The external attachment/detachment memory unit 130 performs recording or reading of an image file in/from a recording medium such as CompactFlash (registered trademark) or a Secure Digital (SD) card. A power supply unit 131 includes a battery, a battery detection circuit, a DC-DC converter, a switch circuit for switching blocks to supply an electric power, and the like. The power supply unit 131 detects whether a battery is attached, the type of the battery, and the remaining battery capacity. The power supply unit 131 controls the DC-DC converter according to a detection result and an instruction from the system control unit 120, and supplies necessary voltage to each block part for a necessary time period.

A shutter control unit 141 controls a shutter 144 using light metering information from a light metering unit 142 in cooperation with a lens control unit 204 for controlling a diaphragm 211. The light metering unit 142 performs automatic exposure (AE) processing. A light beam enters the shooting lens 210 and passes through the lens mounts 202 and 102 and a light metering lens (not shown) into the light metering unit 142. Thus, an exposure state of an image formed as an optical image can be measured. The light metering unit 142 also has a function of electronic flash pre-emission (EF) processing in cooperation with a strobe unit 300. The strobe unit 300 has a function of projecting AF auxiliary light and a flash light amount control function. A range-finding unit 143 performs automatic focus (AF) processing. For example, the range-finding unit 143 is an area or line storage-type photoelectric conversion element such as a complementary metal-oxide semiconductor (CMOS), a charge-coupled device (CCD), or the like. The light beam enters the shooting lens 210, passes through the diaphragm 211, the lens mounts 202 and 102 and a range-finding mirror (not shown), into the range-finding unit 143. Thus, a known image deviation method can be performed to detect focusing, so that an in-focus state of an image formed as an optical image can be measured. Reference numeral 144 denotes the shutter.

The camera control unit 140 controls a series of operation by transmitting or receiving communication with the shutter control unit 141, the light metering unit 142, and the range-finding unit 143. The camera control unit 140 can also control a lens unit 200 and the strobe unit 300.

Operation devices 132, 133, 134, 135, 136, 137, and 138 are used for inputting various operation instructions in the system control unit 120. The operation devices can be one or a plurality of combinations of a switch, a dial, pointing by line-of-sight detection, a speech recognition device, or the like.

The operation devices are described in detail. Using a reproduction display switch 132, reproduction display mode operation can be performed to display predetermined image data on the liquid crystal panel display unit 125. When an image file stored in the external attachment/detachment memory unit 130 is reproduced and displayed, it is required to perform operation using the reproduction switch 132. In a case where the mode is set to the reproduction display mode and the operation of the reproduction switch 132 is performed, the reproduction display mode is switched to a shooting mode.

The menu switch 133 is used to display various item lists on the liquid crystal panel display unit 125. The display contents include state settings relating to image capturing, a format of a recording medium, settings of a clock, development parameter settings, and user function settings (settings of custom function). A "plural camera shooting mode" that is a mode implementing the present invention can be selected from the menu.

The mode dial 134 is used to switch and set each functional shooting mode such as an automatic shooting mode, a program shooting mode, a shutter-priority shooting mode, an aperture-priority shooting mode, a manual shooting mode, a portrait shooting mode, a landscape shooting mode, a sports shooting mode, a night view shooting mode, a moving image mode, and the like.

The release switch 135 is turned on by half-pressing (SW1) of a release button or by full-pressing (SW2) of the release button. In the half-pressing state, an instruction for starting operation such as AF processing, AE processing, automatic white balance (AWB) processing, EF processing, or the like is issued. In the full-pressing state, imaging processing for writing the signal read from the image sensor 121 in the memory 127 as image data via the A/D conversion unit 122 and the memory control unit 124, and development processing using calculation in the image processing unit 123 or the memory control unit 124 are performed. Further, an instruction for starting a series of operation of recording processing is issued. In the recording processing, image data is read from the memory 127, the data in the image processing unit 123 is compressed, and the image data is written in a recording medium (not shown) attached to the external attachment/detachment memory unit 130 are performed.

The operation unit 136 includes various button switches. By using the operation unit 136, operation of a shooting mode, a continuous shooting mode, setting processing, macro processing, page advancing processing, flash setting, menu movement, white balance selection, shooting image quality selection, exposure correction, ISO sensitivity selection, or date/time setting can be performed. Further, the operation unit 136 includes a moving image shooting switch for starting or stopping moving image shooting, a vertical and horizontal direction switch, a zoom magnification change switch for reproduction images, an image display ON/OFF switch for the liquid crystal panel display unit 125, a quick review ON/OFF switch for automatically reproducing shot image data immediately after the image shooting, and an image erasing switch for erasing a reproduction image. Further, the operation unit 136 includes a compression mode switch for selecting each compression rate in Joint Photographic Experts Group (JPEG) and Motion Picture Experts Group (MPEG) and a CCDRAW mode for directly digitalizing and recording a signal of an image sensor. Further, the operation unit 136 includes an AF mode setting switch for setting a servo AF mode for continuing automatic focus operation, and a one-shot AF mode for continuing an in-focus state in automatic focus with a release switch half-pressed.

An electronic dial 137 is used to set a shutter speed, a diaphragm value, an exposure, or the like. Further, a captured image displayed on the liquid crystal panel display unit 125 can be rotated according to a rotation angle of the electronic dial. Further, a straight line indicating a roll angle of an acceleration sensor displayed on the liquid crystal panel display unit 125 can be rotated according to a rotation angle of the electronic dial.

The power supply switch 138 is used to switch and set each mode of power supply ON and power supply OFF of the camera body 100. The power supply switch 138 is also used to switch and set power supply ON and power supply OFF of various accessory devices such as the lens unit 200, the strobe unit 300, a recording medium, or the like connected to the camera body 100.

The timer 139 has a clock function, a calendar function, a timer counter function, and an alarm function, and is used for system management such as managing transition time for a sleep mode, alarm notification, or the like.

The antenna 160 is used to communicate with the other image capturing apparatuses. The transmission/reception circuit 161 is connected to the system control unit 120 and controls transmission or reception. The modulation/demodulation circuit 162 is used to perform necessary modulation processing on information for transmission and output it to the transmission/reception circuit 161, and perform demodulation processing on information received by the transmission/reception unit 161.

The lens mounts 102 and 202 are interfaces for connecting the camera body 100 with the lens unit 200. The lens mounts 102 and 201 are connectors for electrically connecting the camera body 100 with the lens unit 200. The lens mounts 102 and 201 are controlled by the camera control unit 140. The accessory shoes 111 and 301 are interfaces for electrically connecting the camera body 100 with the strobe unit 300.

Reference numeral 200 denotes the interchangeable lens-type lens unit, reference numeral 210 denotes the shooting lens including a lens for focus adjustment, and reference numeral 211 denotes the diaphragm. In the lens unit 200, an optical image (not shown) of an object can be introduced from the shooting lens 210, passed through the diaphragm 211, the lens mounts 202 and 102, and the shutter 144, and formed on the image sensor 121. A distance detection unit 203 obtains information about a distance to an object. The distance detection unit 203 can calculate a distance to an in-focus position by measuring a feed amount of the focus adjustment lens using an encoder.

The lens control unit 204 performs overall control of the lens unit 200. The lens control unit 204 also has a function of a memory for storing constants, variables, programs or the like for operation, and a function of a nonvolatile memory for storing identification information such as a unique number of the lens unit 200, management information, functional information such as a full-aperture value, a minimum diaphragm value, and a focal length, current and past various setting values, and the like. Further, the lens control unit 204 has functions for controlling the diaphragm 211, for controlling focusing of the shooting lens 210, and for controlling zooming of the shooting lens 210.

The strobe unit 300 is to be connected to the accessory shoe 111. A strobe light emission control unit 302 performs overall control of the strobe unit 300. The strobe light emission control unit 302 controls a light emission amount or light emission timing of a light emission unit (not shown) such as a xenon tube using information from the light metering unit 142.

Figure 3:
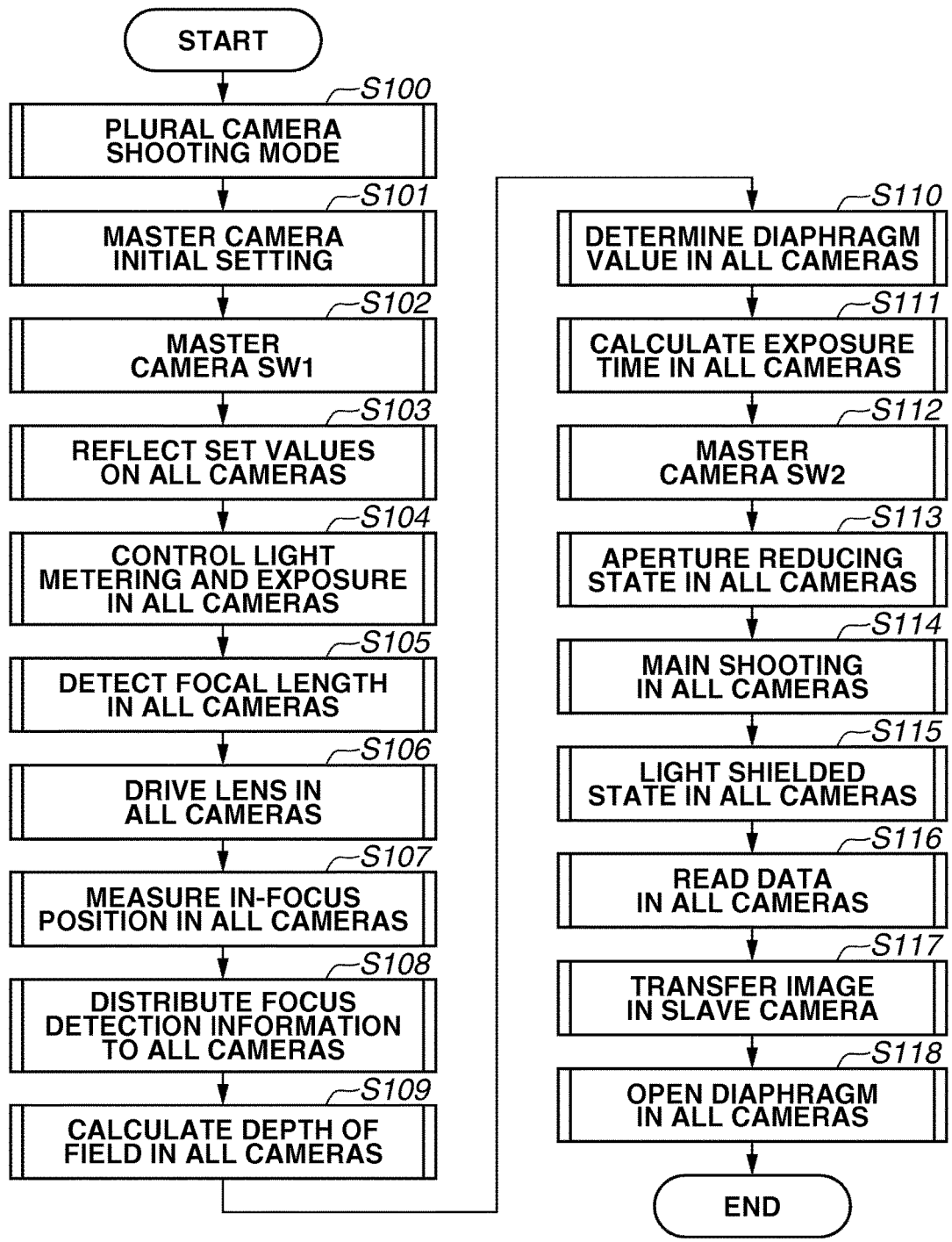
FIG. 3 is a flowchart illustrating an operational sequence in the imaging system according to a first exemplary embodiment.

Operation sequence of the imaging system according to the first exemplary embodiment is described with reference to FIG. 1 and FIG. 3. The sequence is performed in response to turning on the power supply switch 138 of the camera. The processing operation described below is implemented by the system control unit 120 and the camera control unit 140 of the camera executing control programs respectively.

First, in step S100, according to user's operation of the menu switch 133 and the other operation unit 136, if the "plural camera shooting mode" is selected and set, the processing proceeds to step S101. If the mode is not set to the "plural camera shooting mode", a normal single shooting mode is set. Among cameras to be used for the shooting, a camera that is set to the "plural camera shooting mode" first is defined as a master camera 10. In the order of the confirmed the wireless connection, to each of the slave cameras 11, 12, . . . (hereinafter, referred to as slave cameras 11 and 12), ID identification numbers of "ID1", "ID2", "ID3", . . . are assigned. The ID identification numbers are notified to the all slave cameras 11 and 12 via the antenna 160 under the control of the transmission/reception circuit 161, and stored in the nonvolatile memory 128 in each camera. The source of the information distributed among each of the cameras 10 to 12 is identified by the ID identification numbers.

In step S101, initial setting of the master camera 10 is performed by the user. The initial setting includes an exposure condition setting, a light metering method, an ISO sensitivity setting, a continuous shooting mode setting, a flash setting, a white balance selection, a shooting image quality selection, an AF setting, and the like.

In step S102, if the user performs half-pressing (SW1) of the release switch 135 of the master camera 10, the processing proceeds to step S103, using the operation as a trigger. In step S103, the initial settings of the master camera 10 are notified to the all slave cameras 11 and 12 via the antenna 160 under the control of the transmission/reception circuit 161. By the processing, the all cameras 11 and 12 are set to the same conditions.

In step S104, in each of the cameras 10 to 12, luminance information within the screen is input from the shooting information, and it is determined whether the shot image has appropriate brightness. If the brightness is not appropriate, the brightness of the shot image is adjusted by changing the accumulation time of the image sensor 121 or changing a reading gain. According to the information of the accumulation time or the information of the reading gain showing the appropriate brightness of the shot image and the exposure setting value set in step S101, the exposure time and the diaphragm value are calculated.

In step S105, in each of the cameras 10 to 12, the range-finding unit 143 calculates an in-focus state of the object. In step S106, in each of the cameras 10 to 12, a lens movement amount to attain the in-focus state is computed according to the calculated in-focus state, and the computed lens movement amount is output to the lens control unit 204. Using the amount, the lens control unit 204 drives the lens for focus adjustment. By the operation, the shooting lens 210 attains the in-focus state of the object.

In step S107, in each of the cameras 10 to 12, the distance detection unit 203 measures a feed amount of the focus adjustment lens, and calculates a distance to the in-focus position. In step S108, among each of the cameras 10 to 12, the information of the distances to the in-focus positions is distributed via wireless communication.

In step S109, in each of the cameras 10 to 12, using the distributed information of the distances to the in-focus positions in each of the cameras 10 to 12, the depth of field is determined. The determination method of the depth of field is described with reference to FIG. 1. In FIG. 1, reference numeral 13 denotes the in-focus position for the object 20 in the master camera 10, reference numeral 14 denotes the in-focus position for the object 20 in the slave camera 11, and reference numeral 15 denotes the in-focus position for the object 20 in the slave camera 12.

Around the imaging plane center of the master camera 10, a coordinate system $\Sigma_M$ is defined in which the horizontal direction of the imaging plane is an $X_M$ axis, the vertical direction of the imaging plane is a $Y_M$ axis, and the optical axis direction of the lens is a $Z_M$ axis. Similarly, around the imaging plane center of the slave camera 11, a coordinate system $\Sigma_{S1}$ is defined in which the horizontal direction of the imaging plane is an $X_{S1}$ axis, the vertical direction of the imaging plane is a $Y_{S1}$ axis, and the optical axis direction of the lens is a $Z_{S1}$ axis. If a position coordinate of the in-focus position 14 in the coordinate system $\Sigma_{S1}$ is defined by the following equation (1), a position coordinate (the following equation (2)) of the in-focus position 14 in the coordinate system $\Sigma_M$ can be calculated by the following equation (3):

$$^{S1}x_{S1} = [^{S1}x_{S1}, {}^{S1}y_{S1}, {}^{S1}z_{S1}]^T \quad (1)$$

$$^{M}x_{S1} = [^{M}x_{S1}, {}^{M}y_{S1}, {}^{M}z_{S1}]^T \quad (2)$$

$$\begin{bmatrix} {}^{M}x_{S1} \\ {}^{M}y_{S1} \\ {}^{M}z_{S1} \\ 1 \end{bmatrix} = \begin{bmatrix} \cos^{M}\theta_{S1} & 0 & -\sin^{M}\theta_{S1} & {}^{M}p_x \\ 0 & 1 & 0 & {}^{M}p_y \\ \sin^{M}\theta_{S1} & 0 & \cos^{M}\theta_{S1} & {}^{M}p_z \\ 0 & 0 & 0 & 1 \end{bmatrix} \begin{bmatrix} {}^{S1}x_{S1} \\ {}^{S1}y_{S1} \\ {}^{S1}z_{S1} \\ 1 \end{bmatrix} \quad (3)$$

In the equations, $[^{M}P_x, {}^{M}P_y, {}^{M}P_z]$ is the central coordinate in the coordinate system $\Sigma_{S1}$ viewed from the coordinate system $\Sigma_M$, and $^{M}\theta_{S1}$ is the direction indicated by the coordinate axis $Z_{S1}$ viewed from the coordinate system $\Sigma_M$. In the exemplary embodiment, the $[^{M}P_x, {}^{M}P_y, {}^{M}P_z]$ and $^{M}\theta_{S1}$ are known.

The $^{S1}z_{S1}$ in the position coordinate (the above equation (1)) of the in-focus position 14 in the coordinate system $\Sigma_{S1}$ is obtained by calculating the information of the distance to the in-focus position of the slave camera 11. Further, if a focal length in the image capturing apparatus approximated by a pinhole camera model is defined as f, and projection of the in-focus position 14 to the imaging plane of the slave camera 11 is defined as $[^{S1}u, {}^{S1}v]$, $^{S1}x_{S1}$ and $^{S1}y_{S1}$ are calculated by the following equations (4) and (5):

$$^{S1}x_{S1} = {}^{S1}u \frac{{}^{S1}z_{S1}}{f} \quad (4)$$

$$^{S1}y_{S1} = {}^{S1}v \frac{{}^{S1}z_{S1}}{f}. \quad (5)$$

By the above calculation, the coordinate of the in-focus position 14 of the slave camera 11 viewed from the master camera 10 (the master camera 10 as the reference) is calculated. Similarly, the coordinate of the in-focus position 15 of the slave camera 12 viewed from the master camera 10 is calculated. The above-described calculation equations are only an example, and as long as the coordinates of the in-focus positions of each of the cameras 10 to 12 can be calculated, any method can be used.

In the in-focus position coordinates of each of the cameras 10 to 12 viewed from the master camera 10, the nearest in-focus position 13 and the farthest in-focus position 14 are selected. Then, depth of field where the shooting lens 210 comes into focus at least within the range 16 between the nearest in-focus position 13 and the farthest in-focus position 14 is calculated.

As described above, the method for calculating the depth of field has been described with the example of the master camera 10. The depths of field of the slave cameras 11 and 12 are similarly calculated, and thus, the depths of field of the all cameras 10 to 12 are calculated by the above-described processing.

Returning to FIG. 3, in step S110, in each of the cameras 10 to 12, a diaphragm value is determined using the depth of field calculated in step S109. In the processing, to the diaphragm value to be set, thresholds of an upper limit and a lower limit can be set. If a setting value exceeding the thresholds is calculated, warning can be issued using the liquid crystal panel display unit 125, voice, an LED, or the like. In step S111, in each of the cameras 10 to 12, exposure time is calculated using the diaphragm value determined in step S110 and the exposure setting value set in step S101.

In step S112, if the user fully presses the release switch 135 (SW2) of the master camera 10, the processing proceeds to step S113, using the operation as a trigger. In step S113, in each of the cameras 10 to 12, the diaphragm value calculated in step S110 is output to the lens control unit 204. Using the information, the lens control unit 204 drives the diaphragm 211. By the operation, the shooting lens attains an aperture stop state.

In step S114, in each of the cameras 10 to 12, the system control unit 120 outputs an instruction for setting the accumulation time of the image sensor 121 according to the exposure time calculated in step S111, and then main shooting is performed by the image sensor 121. The shooting instruction from the system control unit 120 is performed in synchronization with each other in cameras 10 to 12.

In step S115, in each of the cameras 10 to 12, a signal for placing the diaphragm 211 in a light shielded state is output to the lens control unit 204. By the processing, the shooting lens attains the light shielded state.

In step S116, in each of the cameras 10 to 12, the shot image information by the main shooting is A/D converted and read from the image sensor 121 in the A/D conversion unit 122. Then, necessary correction processing and signal processing are performed in the image processing apparatus 123, and written in the memory 127 via the memory control unit 124.

In step S117, the shot image in each of the slave cameras 11 and 12 acquired in step S116 is transmitted to the master camera 10 via the antenna 160 under the control of the transmission/reception circuit 161. In the master camera 10, the received shot images of the slave cameras 11 and 12 are written in the memory 127 via the memory control unit 124. The image shot by the master camera 10 itself is also written in the memory 127. Then, the image data is read from the memory 127, and further compressed in the image processing unit 123. The image data is written in a recording medium (not shown) mounted to the external attachment/detachment memory unit 130.

In step S118, in each of the cameras 10 to 12, a signal for placing the diaphragm 211 in an open state is output to the lens control unit 204. By the processing, the shooting lens attains the open state.

In the above description, the first exemplary embodiment has been described. In the first exemplary embodiment, the information of the distance to the in-focus position in each of the cameras 10 to 12 is transmitted and received to/from the cameras 10 to 12 each other. Then, using the information of the distances to the in-focus positions in all of the cameras 10 to 12, each depth of field is determined. With the above-described configuration, the depth of field of each of the cameras 10 to 12 can be adjusted such that all of the cameras 10 to 12 come into focus at the in-focus positions. Further, in the first exemplary embodiment, the exposure condition setting, the light metering method, the ISO sensitivity setting, the continuous shooting mode setting, the flash setting, the white balance selection, and the shooting image quality selection of each of the cameras 10 to 12 can be similarly set. Accordingly, in performing image synthesis such as three-dimensional image acquisition, natural shot images can be obtained.

In the first exemplary embodiment, each of the cameras 10 to 12 wirelessly communicates with each other. However, wired communication can be employed. Further, for the sake of simplicity, the slave cameras 11 and 12 are distinguished with each other. However, in the configuration, it is not always necessary to distinguish the cameras. Further, in the first exemplary embodiment, the range in which the shooting lens 210 of each of the cameras 10 to 12 comes into focus is adjusted by changing the diaphragm value. However, at the same time, the focal length can be adjusted. Further, in the first exemplary embodiment, the distance from each of the cameras 10 to 12 to the in-focus position is calculated by measuring the feed amount of the focus adjustment lens. However, the range finding means can be any means. Further, in the first exemplary embodiment, the captured images in the slave cameras 11 and 12 are transmitted to the master camera 10. However, it is not always necessary to transmit the images, but the images can be stored in the external attachment/detachment memory unit 130 that is mounted to each of the cameras 10 to 12. The images can be transmitted to a device such as a server other than the master camera 10.

Further, in the first exemplary embodiment, [$^M P_x$, $^M P_y$, $^M P_z$] and $^M \theta_{S1}$ are known. However, using a position measuring means such as a global positioning system (GPS) function and the orientation detection unit 129, the location of each of the cameras 10 to 12 can be measured.

Figure 4:
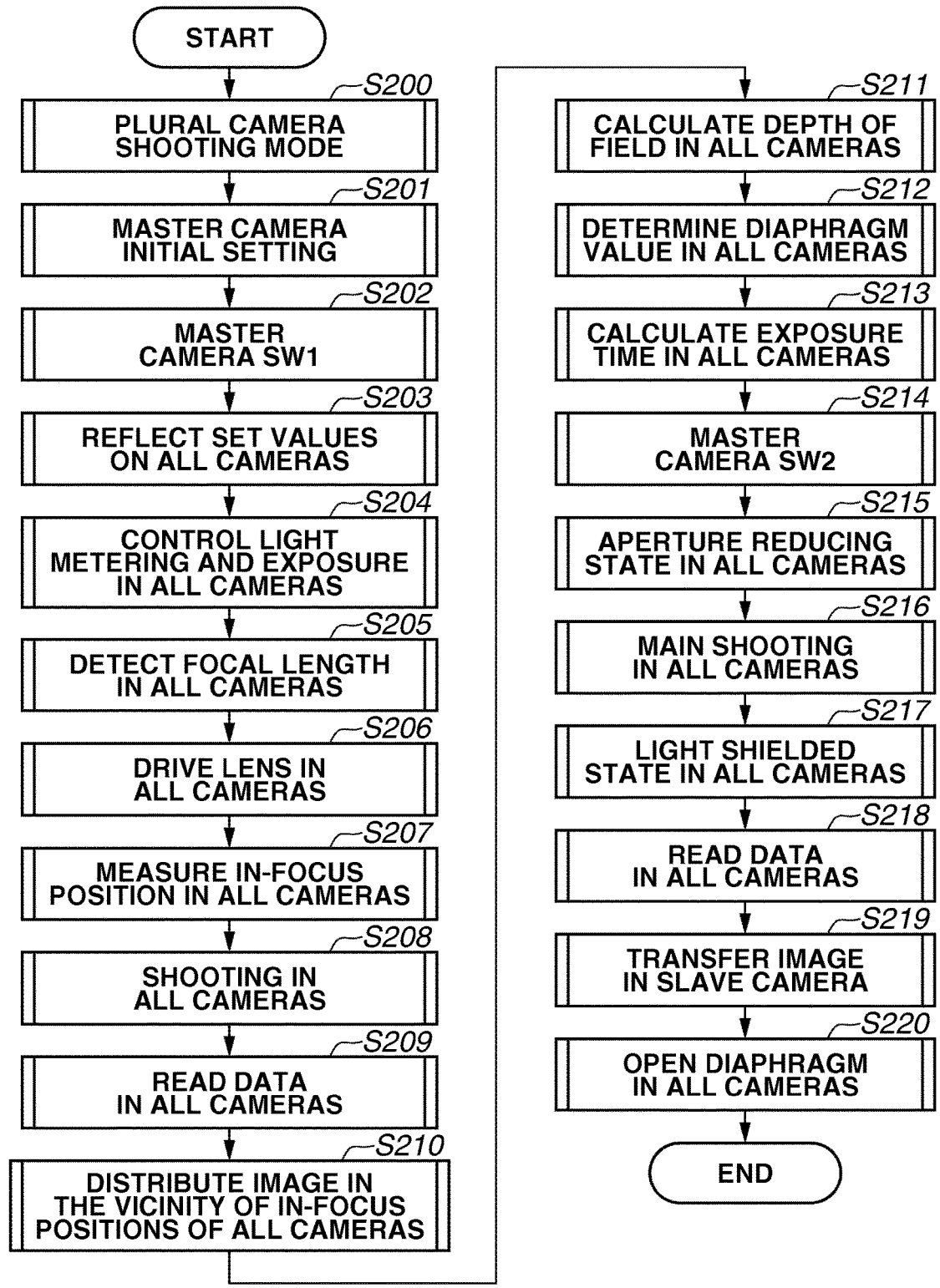
FIG. 4 is a flowchart illustrating an operational sequence in the imaging system according to a second exemplary embodiment.

A second exemplary embodiment is described. The configurations of the imaging system and the cameras are similar to those in the first exemplary embodiment, therefore, their descriptions are omitted. Operation sequence of the imaging system according to the second exemplary embodiment is described with reference to FIG. 4 and FIG. 5. The processing operation described below is implemented by the system control unit 120 and the camera control unit 140 of the camera executing control programs respectively. The processing in steps S200 to S207 is similar to that in steps S100 to S107 in the first exemplary embodiment, and accordingly, the description is omitted.

In step S208, in each of the cameras 10 to 12, according to the camera initial setting values set in step S201, an instruction is output from the system control unit 120 to the image sensor 121, and shooting is performed. The shooting instruction from the system control unit 120 is performed in synchronization with each other in cameras 10 to 12.

In step S209, in each of the cameras 10 to 12, the shot image information by the shooting is A/D converted and read from the image sensor 121 in the A/D conversion unit 122. The data is written in the memory 127 via the memory control unit 124.

In step S210, in each of the cameras 10 to 12, an image (shot image including the in-focus position) of the neighborhood of the in-focus position is cut out from the shot image, and wirelessly distributed among each of the cameras 10 to 12. In step S211, in each of the cameras 10 to 12, using the image of the neighborhood of the in-focus position in each of the cameras 10 to 12, the depth of field is determined.

Figure 5:
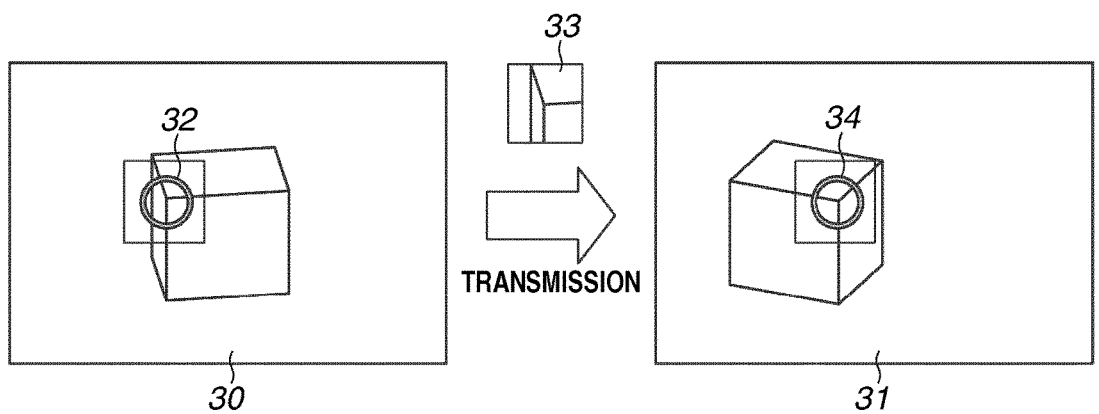
FIG. 5 shows that an image of the neighborhood of an in-focus position is cut out from a captured image and the image is transmitted and received among cameras according to the second exemplary embodiment.

The processing in steps S210 and S211 is described with reference to FIG. 5. In FIG. 5, reference numeral 30 denotes the shot image in the slave camera acquired in step S209, and reference numeral 31 denotes the shot image in the master camera 10 acquired similarly in step S209. Reference numeral 32 denotes the in-focus position in the slave camera. First, in step S210, in the slave camera, from the shot image 30 in the slave camera, an image 33 in the neighborhood 32 of the in-focus position is cut out, and distributed to the master camera 10 via the antenna 160 under the control of the transmission/reception circuit 161.

In step S211, in the image processing unit 123 of the master camera 10, correlation calculation of the in-focus position neighbor image 33 in the slave camera transmitted from the slave camera and the shot image 31 in the master camera 10 is performed. In the shot image 31 of the master camera 10, a region 34 that has a highest correlation with the in-focus position neighbor image 33 in the slave camera is calculated. The region 34 shows the in-focus position of the slave camera within the shot image of the master camera 10. Similarly, the correlation calculation between the in-focus position neighbor images 33 in the all slave cameras is performed, and the individual in-focus positions of the slave cameras in the shot image within the master camera 10 are calculated. Then, with respect to the individual neighborhood of the in-focus positions of the slave cameras, in-focus states are calculated in the range-finding unit 143. Then, the depth of field in which the shooting lens 210 comes into focus at the all in-focus positions viewed from the master camera 10 is calculated.

In the above description, the method for calculating the depth of field has been described with the example of the master camera 10. The depths of field of the slave cameras 11 and 12 are similarly calculated, and thus, the depths of field of the all cameras 10 to 12 are calculated by the above-described processing.

Returning to FIG. 4, the following processing in steps S212 to S220 is similar to that in steps S110 to S118 in the first exemplary embodiment, and accordingly, the description is omitted.

In the description above, the second exemplary embodiment has been described. In the second exemplary embodiment, the shot images including the in-focus positions in each of the cameras 10 to 12 are transmitted and received to/from the cameras 10 to 12. Then, using the shot images including the in-focus positions shot in cameras 10 to 12, the individual depths of field are determined. In the first exemplary embodiment, it is necessary to acquire the location information among each of the cameras 10 to 12 using some method. On the other hand, in the second exemplary embodiment, even if the location information among each of the cameras 10 to 12 is unknown, the depths of field of each of the cameras 10 to 12 can be adjusted such that the in-focus positions of the cameras 10 to 12 are focused. By the configuration, in performing image synthesis such as three-dimensional image acquisition, natural shot images can be obtained. In the first exemplary embodiment, it is necessary to calculate the distance from each of the cameras 10 to 12 to the in-focus positions by measuring the feed amount of the focus adjustment lens. In the second exemplary embodiment, as long as the in-focus state can be confirmed by the range-finding unit 143, it is not necessary to perform the measurement from each of the cameras 10 to 12 to the in-focus positions.

In the second exemplary embodiment, one in-focus position neighbor image in each camera is transmitted. However, a plurality of in-focus position neighbor images in each camera can be transmitted.

Figure 6:
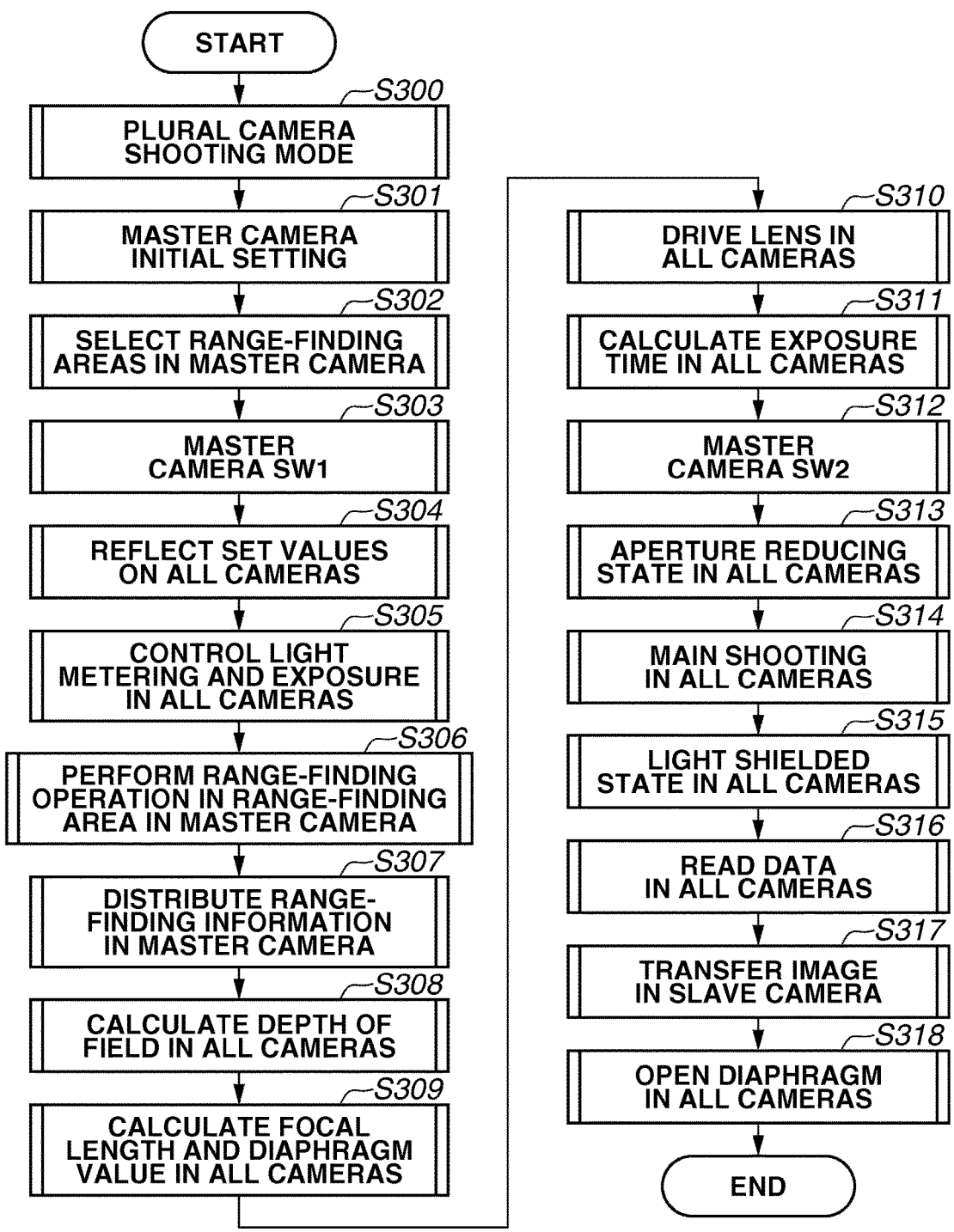
FIG. 6 is a flowchart illustrating an operational sequence in an imaging system according to a third exemplary embodiment.

A third exemplary embodiment is described. The configurations of the imaging system and the cameras are similar to those in the first exemplary embodiment, and therefore, the descriptions are omitted. Operation sequence of the imaging system according to the third exemplary embodiment is described with reference to FIG. 6 and FIG. 7. The processing operation described below is implemented by the system control unit 120 and the camera control unit 140 of the camera executing control programs respectively. The processing in steps S300 to S301 is similar to that in steps S100 to S101 in the first exemplary embodiment, and accordingly, the description is omitted.

Figure 7:
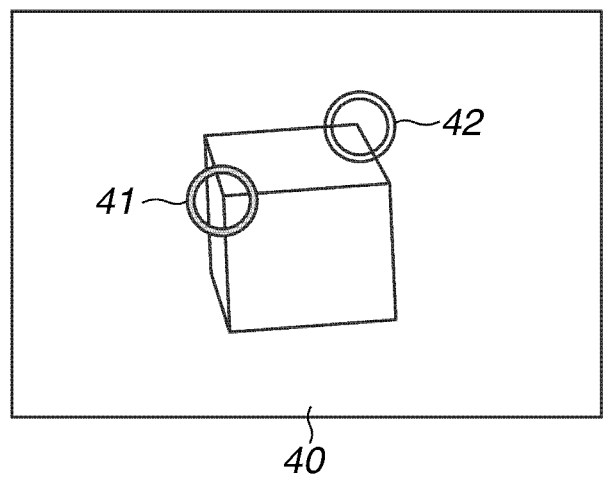
FIG. 7 illustrates an example of a method for selecting a plurality of points of an object to be focused.

In step S302, in the master camera 10, a plurality of areas the user wants to focus to the object is selected. As the method for the selection, an area to be focused is selected from a plurality of range finding areas displayed in a liquid crystal electronic viewfinder (not shown). The method is described with reference to FIG. 7. In FIG. 7, reference numeral 40 denotes a shot image displayed in the electronic viewfinder, reference numeral 41 denotes a selected first range finding area, and reference numeral 42 denotes a second range finding area.

In step S303, if the user perform half-pressing (SW1) of the release switch 135 of the master camera 10, the processing proceeds to step S304, using the operation as a trigger. In step S304, the initial settings of the master camera 10 are notified to the slave cameras 11 and 12 via the antenna 160 under the control of the transmission/reception circuit 161. By the processing, the cameras 11 and 12 are set to the same conditions.

In step S305, in each of the cameras 10 to 12, luminance information within the screen is input from the shooting information, and it is determined whether the shot image has appropriate brightness. If the brightness is not appropriate, the brightness of the shot image is adjusted by changing the accumulation time of the image sensor 121 or changing the reading gain. According the information of the accumulation time or the information of the reading gain showing the appropriate brightness of the shot image, and the exposure setting value set in step S301, the exposure time and the diaphragm value are calculated.

In step S306, in the master camera 10, an in-focus state in each of the range finding areas specified in step S302 is calculated. Then, according to the calculated in-focus state, a lens movement amount to attain the in-focus state is calculated for each range finding area, and the calculated each lens movement amount is output to the lens control unit 204 in ascending order. Using the lens movement amount, while the lens control unit 204 drives the focus adjustment lens, a feed amount of the focus adjustment lens is measured, and a distance to the in-focus position for each range finding area is calculated.

In step S307, in the master camera 10, the range finding information up to the plurality of in-focus positions calculated in step S306 is distributed to the all slave cameras 11 and 12 via the antenna 160 under the control of the transmission/reception circuit 161.

In step S308, in each of the slave cameras 11 and 12, by the same method as the method described in step S109 in the first exemplary embodiment, out of the in-focus position coordinates in the master camera 10 viewed from each of the slave cameras 11 and 12, a nearest in-focus position and a farthest in-focus position are selected. Then, the depth of field in which the lens comes into focus at least within the range from the nearest in-focus position to the farthest in-focus position is calculated. In the master camera 10, from the information of the distances to the in-focus positions calculated in step S306, the depth of field in which the lens comes into focus at least within the range from the nearest in-focus position to the farthest in-focus position is calculated.

In step S309, in each of the cameras 10 to 12, from the depth of field of each camera calculated in step S308, a focal length and a diaphragm value of each lens are calculated. In step S310, in each of the cameras 10 to 12, a lens movement amount of each lens is calculated from the focal length calculated in step S309, and the calculated lens movement amount is output to the lens control unit 204. Using the lens movement amount, the lens control unit 204 drives the focus adjustment lens.

The following processing in steps S311 to S318 is similar to that in steps S111 to S118 in the first exemplary embodiment, and accordingly, the description is omitted.

In the above description, the third exemplary embodiment has been described. In the third exemplary embodiment, in the plurality of cameras 10 to 12, at least one camera 10 transmits the information of the distances to the selected points to be focused to the object, to the other cameras 11 and 12. Then, using the information of the distances to the positions to be focused to the object, each of the cameras 10 to 12 determines each depth of field. In the third exemplary embodiment, the range to be focused to the object can be determined as the user intends.

As the method for selecting the range finding areas in step S303, a shot image of the object can be displayed on the liquid crystal panel display unit 125, using the vertical direction switch in the operation unit 136 such that a cursor displayed on the liquid crystal panel display unit 125 can be set to an area to be focused. Further, a touch panel input unit can be provided on the liquid crystal panel display unit 125, and an area to be focused can be set through touch panel input. The depth of field calculation method in step S308 is similar to that in step S109 in the first exemplary embodiment. However, the method in step S211 in the second exemplary embodiment can be used.

Other Embodiments

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging system for capturing images including a same object using a plurality of image capturing apparatuses capable of communicating with each other, the imaging system comprising:
at least one image capturing apparatus of the image capturing apparatuses transmits captured image data which is cut-out of a first captured image including an in-focus position, wherein the transmitted image also includes the in-focus position, to another image capturing apparatus among the image capturing apparatuses, and
each of the image capturing apparatuses determines each depth of field by using signals from an image area located within a second captured image, wherein the image area is an area selected from the second captured image on the basis of a correlation with the transmitted image,
wherein the image area shows the in-focus position of the first captured image within the second captured image.

2. The imaging system according to claim 1, wherein the image capturing apparatuses in the imaging system transmit or receive the image including the in-focus position that is cut-out of the first captured image in each apparatus to/from the image capturing apparatuses to each other, and each of the image capturing apparatuses determines each depth of field using the second captured image including the in-focus positions captured in all the apparatuses.

3. An image capturing apparatus comprising:
an imaging unit configured to capture an image of an object;
a transmission unit configured to transmit an image including an in-focus position, to a first image capturing apparatus;
a reception unit configured to receive captured image data including an in-focus position that was cut-out of a first captured image on a second image capturing apparatus, from the second image capturing apparatus; and
a control unit configured to control parameters to capture the image of the object according to signals from an image area in a second captured image,
wherein the image area is an area selected from the second captured image on the basis of a correlation with the image received by the reception unit.

4. The image capturing apparatus according to claim 3, wherein the image area shows the in-focus position of the first captured image within the second captured image.

5. The image capturing apparatus according to claim 3, wherein the control unit is configured to determine depth of field by using signals from an image area in a second captured image, wherein the image area is an area selected from the second captured image on the basis of a correlation with the received image.

6. The image capturing apparatus according to claim 3, wherein the control unit is configured to determine depth of field as an in-focus position in a captured image via the imaging unit and an in-focus position in the received image is in the depth of field.

7. The image capturing apparatus according to claim 3, wherein the selected image is an image which is a most correlative image with the received image.

8. The image capturing apparatus according to claim 3, wherein the first image capturing apparatus is different from the second image capturing apparatus.

* * * * *